(12) United States Patent
Yoo et al.

(10) Patent No.: US 11,962,757 B2
(45) Date of Patent: Apr. 16, 2024

(54) RESIDUAL SIGNAL ENCODING/DECODING METHOD AND APPARATUS EMPLOYING INTRA SUB-PARTITIONS (ISP), AND METHOD FOR TRANSMITTING BITSTREAM

(71) Applicant: LG ELECTRONICS INC., Seoul (KR)

(72) Inventors: Sunmi Yoo, Seoul (KR); Jungah Choi, Seoul (KR); Jin Heo, Seoul (KR); Jangwon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 300 days.

(21) Appl. No.: 17/442,009

(22) PCT Filed: Mar. 23, 2020

(86) PCT No.: PCT/KR2020/003954
§ 371 (c)(1),
(2) Date: Feb. 3, 2022

(87) PCT Pub. No.: WO2020/197222
PCT Pub. Date: Oct. 1, 2020

(65) Prior Publication Data
US 2022/0201280 A1   Jun. 23, 2022

Related U.S. Application Data

(60) Provisional application No. 62/822,883, filed on Mar. 24, 2019, provisional application No. 62/822,806, filed on Mar. 23, 2019.

(51) Int. Cl.
*H04N 19/105*   (2014.01)
*H04N 19/119*   (2014.01)
(Continued)

(52) U.S. Cl.
CPC ......... *H04N 19/105* (2014.11); *H04N 19/119* (2014.11); *H04N 19/159* (2014.11); *H04N 19/176* (2014.11); *H04N 19/61* (2014.11)

(58) Field of Classification Search
CPC .... H04N 19/105; H04N 19/119; H04N 19/13; H04N 19/159; H04N 19/176; H04N 19/61; H04N 19/70
See application file for complete search history.

(56) References Cited

U.S. PATENT DOCUMENTS

2015/0016515 A1   1/2015  Naccari et al.
2019/0208225 A1*  7/2019  Chen ................... H04N 19/18
(Continued)

FOREIGN PATENT DOCUMENTS

JP   2001292451 A   10/2001
JP   2017188944 A   10/2017
KR   20140028129 A   3/2014

OTHER PUBLICATIONS

Santiago De-Luxán-Hernandez, et al., "CE3-related: Improvement on the Intra Sub-Partitions Coding Mode", Joint Video Experts Team (JVET) of ITU-T SG 16 WP 3 and ISO/IEC JTC 1/SC 29/WG 11, 13th Meeting: Marrakech, MA, Jan. 9-18, 2019. JVET-M0426-v1.

(Continued)

*Primary Examiner* — Mohammed S Rahaman
(74) *Attorney, Agent, or Firm* — Bryan Cave Leighton Paisner LLP

(57) ABSTRACT

An image encoding/decoding method and apparatus are provided. The image decoding method includes determining whether a prediction mode of a current block is an intra prediction mode based on information on the prediction mode of the current block, determining whether a transform mode of the current block is a transform skip mode, determining whether an intra prediction technique of the current (Continued)

block is intra sub-partitions (ISP) based on the prediction mode of the current block being an intra prediction mode, and generating a transform coefficient block of the current block based on the transform mode of the current block and whether the intra prediction technique of the current block is ISP.

12 Claims, 13 Drawing Sheets

(51) Int. Cl.
*H04N 19/159* (2014.01)
*H04N 19/176* (2014.01)
*H04N 19/61* (2014.01)

(56) References Cited

U.S. PATENT DOCUMENTS

| 2020/0053385 A1* | 2/2020 | Lee | H04N 19/124 |
| 2020/0260078 A1* | 8/2020 | Zhao | H04N 19/61 |
| 2020/0304789 A1* | 9/2020 | Zhao | H04N 19/122 |

OTHER PUBLICATIONS

Xiaoqiang Cao, et al. "Non-CE6: Simplification on transform selection for Intra Sub-Partitions" Joint Video Experts Team (JVET) of ITU-T SG 16 WP 3 and ISO/IEC JTC 1/SC 29/WG 11, 14th Meeting: Geneva, CH, Mar. 19-27, 2019. Document: JVET-N0160_v2.

* cited by examiner

FIG. 6

| coding_unit( x0, y0, cbWidth, cbHeight, cqtDepth, treeType, modeType ) { | Descriptor |
|---|---|
| ... | |
|     if (intra_luma_ref_idx[ x0 ][ y0 ] = = 0 && <br>     ( cbWidth <= MaxTbSizeY \|\| cbHeight <= MaxTbSizeY ) && <br>     ( cbWidth * cbHeight > MinTbSizeY * MinTbSizeY )) | |
|     intra_subpartitions_mode_flag[ x0 ][ y0 ] | ae(v) |
|     if( intra_subpartitions_mode_flag[ x0 ][ y0 ] = = 1 && <br>     cbWidth <= MaxTbSizeY && cbHeight <= MaxTbSizeY ) | |
|     intra_subpartitions_split_flag[ x0 ][ y0 ] | ae(v) |
| ... | |

FIG. 8a

| residual_coding_ts( x0, y0, log2TbWidth, log2TbHeight, cIdx ) { | Descriptor |
|---|---|
| log2SbSize = ( Min( log2TbWidth, log2TbHeight ) < 2 ? 1 : 2 ) | |
| numSbCoeff = 1 << ( log2SbSize << 1 ) | |
| lastSubBlock = ( 1 << ( log2TbWidth + log2TbHeight − 2 * log2SbSize ) ) − 1 | |
| /* Loop over subblocks from last to the top-left (DC) subblock */ | |
| inferSbCbf = 1 | |
| MaxCcbs = 2 * ( 1 << log2TbWidth ) * ( 1 << log2TbHeight ) | |
| for( i =0; i <= lastSubBlock; i++ ) { | |
|     xS = DiagScanOrder[ log2TbWidth − log2SbSize ][ log2TbHeight − log2SbSize ][ i ][ 0 ] | |
|     yS = DiagScanOrder[ log2TbWidth − log2SbSize ][ log2TbHeight − log2SbSize ][ i ][ 1 ] | |
|     if( ( i != lastSubBlock \|\| !inferSbCbf ) | |
|         coded_sub_block_flag[ xS ][ yS ] | ae(v) |
|         MaxCcbs− − | |
|     if( coded_sub_block_flag[ xS ][ yS ] && i < lastSubBlock ) | |
|         inferSbCbf = 0 | |
| } | |

FIG. 8b

| /* First scan pass */ | |
|---|---|
| inferSbSigCoeffFlag = 1 | |
| for( n = ( i == 0; n <= numSbCoeff − 1; n++ ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( coded_sub_block_flag[ xS ][ yS ] && | |
|         ( n == numSbCoeff − 1 \|\| !inferSbSigCoeffFlag ) ) { | |
|         sig_coeff_flag[ xC ][ yC ] | ae(v) |
|         MaxCcbs− − | |
|         if( sig_coeff_flag[ xC ][ yC ] ) | |
|             inferSbSigCoeffFlag = 0 | |
|     } | |
|     if( sig_coeff_flag[ xC ][ yC ] ) { | |
|         coeff_sign_flag[ n ] | ae(v) |
|         abs_level_gtx_flag[ n ][ 0 ] | ae(v) |
|         MaxCcbs = MaxCcbs − 2 | |
|         if( abs_level_gtx_flag[ n ][ 0 ] ) { | |
|             par_level_flag[ n ] | ae(v) |
|             MaxCcbs− − | |
|         } | |
|     } | |
|     AbsLevelPassX[ xC ][ yC ] = | |
|         sig_coeff_flag[ xC ][ yC ] + par_level_flag[ n ] + abs_level_gtx_flag[ n ][ 0 ] | |
| } | |

FIG. 8c

```
/* Greater than X scan passes (numGtXFlags=5) */
for( i = 1; i <= 5 - 1 && abs_level_gtx_flag[ n ][ i - 1 ]; i++ ) {
  for( n = 0; n <= numSbCoeff - 1; n++ ) {
    xC = ( xS << log2SbSize ) + DiagScanOrder[ log2SbSize ][ log2SbSize ][ n ][ 0 ]
    yC = ( yS << log2SbSize ) + DiagScanOrder[ log2SbSize ][ log2SbSize ][ n ][ 1 ]
    abs_level_gtx_flag[ n ][ i ]                                                    ae(v)
    MaxCcbs--
    AbsLevelPassX[ xC ][ yC ] += 2 * abs_level_gtx_flag[ n ][ i ]
  }
}
/* remainder scan pass */
for( n = 0; n <= numSbCoeff - 1; n++ ) {
  xC = ( xS << log2SbSize ) + DiagScanOrder[ log2SbSize ][ log2SbSize ][ n ][ 0 ]
  yC = ( yS << log2SbSize ) + DiagScanOrder[ log2SbSize ][ log2SbSize ][ n ][ 1 ]
  if( abs_level_gtx_flag[ n ][ numGtXFlags - 1 ] )
    abs_remainder[ n ]                                                              ae(v)
    TransCoeffLevel[ x0 ][ y0 ][ cIdx ][ xC ][ yC ] = ( 1 - 2 * coeff_sign_flag[ n ] ) *
                    ( AbsLevelPassX[ xC ][ yC ] + abs_remainder[ n ] )
}
}
}
```

FIG. 9

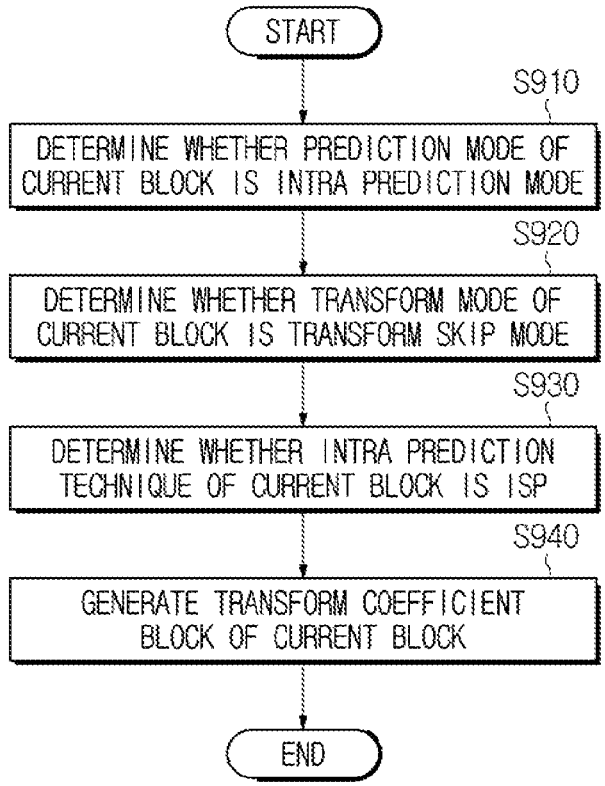

FIG. 12a

| residual_coding_ts( x0, y0, log2TbWidth, log2TbHeight, cIdx ) { | Descriptor |
|---|---|
|    log2SbW = ( Min( log2TbWidth, log2TbHeight ) < 2 ? 1 : 2 ) | |
|    log2SbH = log2SbW | |
|    if ( log2TbWidth < 2 && cIdx == 0 ) { | |
|      log2SbW = log2TbWidth | |
|      log2SbH = 4 - log2SbW | |
|    } else if ( log2TbHeight < 2 && cIdx == 0 ) { | |
|      log2SbH = log2TbHeight | |
|      log2SbW = 4 - log2SbH | |
|    } | |
|    numSbCoeff = 1 << ( log2SbW + log2SbH ) | |
|    lastSubBlock = ( 1 << ( log2TbWidth + log2TbHeight - ( log2SbW + log2SbH ) ) ) - 1 | |

FIG. 12b

| | |
|---|---|
| /* Loop over subblocks from last to the top-left (DC) subblock */ | |
|    inferSbCbf = 1 | |
|    MaxCcbs = 2 * ( 1 << log2TbWidth ) * ( 1 << log2TbHeight ) | |
|    for( i =0; i <= lastSubBlock; i++ ) { | |
|      xS = DiagScanOrder[ log2TbWidth - log2SbW ][ log2TbHeight - log2SbH ][ i ][ 0 ] | |
|      yS = DiagScanOrder[ log2TbWidth - log2SbW ][ log2TbHeight - log2SbH ][ i ][ 1 ] | |
|      if( ( i != lastSubBlock \|\| !inferSbCbf ) | |
|         coded_sub_block_flag[ xS ][ yS ] | ae(v) |
|         MaxCcbs- - | |
|      if( coded_sub_block_flag[ xS ][ yS ] && i < lastSubBlock ) | |
|         inferSbCbf = 0 | |
|    } | |

FIG. 12c

| | |
|---|---|
| /* First scan pass */ | |
| inferSbSigCoeffFlag = 1 | |
| for( n = ( i == 0; n <= numSbCoeff - 1; n++ ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( coded_sub_block_flag[ xS ][ yS ] && | |
|     ( n == numSbCoeff - 1 \|\| !inferSbSigCoeffFlag ) ) { | |
|     sig_coeff_flag[ xC ][ yC ] | ae(v) |
|     MaxCcbs-- | |
|     if( sig_coeff_flag[ xC ][ yC ] ) | |
|       inferSbSigCoeffFlag = 0 | |
|   } | |
|   if( sig_coeff_flag[ xC ][ yC ] ) { | |
|     coeff_sign_flag[ n ] | ae(v) |
|     abs_level_gtx_flag[ n ][ 0 ] | ae(v) |
|     MaxCcbs = MaxCcbs - 2 | |
|     if( abs_level_gtx_flag[ n ][ 0 ] ) { | |
|       par_level_flag[ n ] | ae(v) |
|       MaxCcbs-- | |
|     } | |
|   } | |
|   AbsLevelPassX[ xC ][ yC ] = | |
|     sig_coeff_flag[ xC ][ yC ] + par_level_flag[ n ] + abs_level_gtx_flag[ n ][ 0 ] | |
| } | |
| /* Greater than X scan passes (numGtXFlags=5) */ | |
| for( i = 1; i <= 5 - 1 && abs_level_gtx_flag[ n ][ i - 1 ]; i++ ) { | |
|   for( n = 0; n <= numSbCoeff - 1; n++ ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     abs_level_gtx_flag[ n ][ i ] | ae(v) |
|     MaxCcbs-- | |
|     AbsLevelPassX[ xC ][ yC ] += 2 * abs_level_gtx_flag[ n ][ i ] | |
|   } | |
| } | |

FIG. 12d

| | |
|---|---|
| /* remainder scan pass */ | |
| for( n = 0; n <= numSbCoeff - 1; n++ ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( abs_level_gtx_flag[ n ][ numGtXFlags - 1 ] ) | |
|     abs_remainder[ n ] | ae(v) |
|     TransCoeffLevel[ x0 ][ y0 ][ cIdx ][ xC ][ yC ] = ( 1 - 2 * coeff_sign_flag[ n ] ) * | |
|       ( AbsLevelPassX[ xC ][ yC ] + abs_remainder[ n ] ) | |
|   } | |
| } | |
| } | |

FIG. 13a

| | |
|---|---|
| /* Loop over subblocks from last to the top-left (DC) subblock */ | |
| inferSbCbf = 1 | |
| MaxCcbs = 2 * ( 1 << log2TbWidth ) * ( 1<< log2TbHeight ) | |
| for( i =0; i <= lastSubBlock; i++ ) { | |
| xS = DiagScanOrder[ log2TbWidth - log2SbW ][ log2TbHeight - log2SbH ][ i ][ 0 ] | |
| yS = DiagScanOrder[ log2TbWidth - log2SbW ][ log2TbHeight - log2SbH ][ i ][ 1 ] | |
| if( ( i != lastSubBlock \|\| !inferSbCbf ) | |
|   coded_sub_block_flag[ xS ][ yS ] | ae(v) |
|   MaxCcbs- - | |
| if( coded_sub_block_flag[ xS ][ yS ] && i < lastSubBlock ) | |
|   inferSbCbf = 0 | |
| } | |

FIG. 13b

| | |
|---|---|
| /* Loop over subblocks from last to the top-left (DC) subblock */ | |
| inferSbCbf = 1 | |
| MaxCcbs = 2 * ( 1 << log2TbWidth ) * ( 1<< log2TbHeight ) | |
| for( i =0; i <= lastSubBlock; i++ ) { | |
| xS = DiagScanOrder[ log2TbWidth - log2SbW ][ log2TbHeight - log2SbH ][ i ][ 0 ] | |
| yS = DiagScanOrder[ log2TbWidth - log2SbW ][ log2TbHeight - log2SbH ][ i ][ 1 ] | |

RESIDUAL SIGNAL ENCODING/DECODING METHOD AND APPARATUS EMPLOYING INTRA SUB-PARTITIONS (ISP), AND METHOD FOR TRANSMITTING BITSTREAM

CROSS-REFERENCE TO RELATED APPLICATIONS

This application is a National Stage filing under 35 U.S.C. 371 of International Application No. PCT/KR2020/003954, filed on Mar. 23, 2020, which claims the benefit of U.S. Provisional Application Nos. 62/822,806 filed on Mar. 23, 2019, and 62/822,833 filed Mar. 24, 2019, the contents of which are all hereby incorporated by reference herein in their entirety.

TECHNICAL FIELD

The present disclosure relates to an image encoding/decoding method and apparatus and a method of transmitting a bitstream and, more particularly, to a method and apparatus for encoding/decoding a residual signal using intra sub-partitions (ISP), and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

In addition, an object of the present disclosure is to provide a method and apparatus for encoding/decoding an image using intra sub-partitions (ISP).

In addition, an object of the present disclosure is to provide a method and apparatus for encoding/decoding a residual signal, to which ISP and a transform skip mode apply.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

According to an image encoding/decoding method of an aspect of the present disclosure, a residual signal of a block to which a transform skip mode and ISP apply may be encoded/decoded. Specifically, at least one of a context model, a size of a transform subblock, a scan method and/or a syntax element encoding/decoding method may be determined in consideration of characteristics of a block to which a transform skip mode and ISP apply, thereby increasing encoding efficiency.

An image decoding method according to an aspect of the present disclosure may include determining whether a prediction mode of a current block is an intra prediction mode based on information on the prediction mode of the current block, determining whether a transform mode of the current block is a transform skip mode, determining whether an intra prediction technique of the current block is intra sub-partitions (ISP) based on the prediction mode of the current block being an intra prediction mode, and generating a transform coefficient block of the current block based on the transform mode of the current block and whether the intra prediction technique of the current block is ISP.

In the image decoding method of the present disclosure, the generating the transform coefficient block may include splitting the transform coefficient block of the current block into transform subblocks having a predetermined size and reconstructing a transform coefficient included in a transform subblock by decoding information on a transform coefficient included in the transform subblock.

In the image decoding method of the present disclosure, the reconstructing the transform coefficient included in the transform subblock may be performed based on first information specifying whether a non-zero transform coefficient is included in the transform subblock.

In the image decoding method of the present disclosure, based on the transform mode of the current block being a transform skip mode and the intra prediction technique of the current block being ISP, parsing of the first information is skipped, and the first information is set to specify that the transform subblock includes a non-zero transform coefficient.

In the image decoding method of the present disclosure, a width and height of the transform subblock may be determined based on whether the intra prediction technique of the current block is ISP.

In the image decoding method of the present disclosure, based on the intra prediction technique of the current block being ISP, when the width of the current block is W and the height thereof is H, a size of the transform subblock may be determined to be W×(16/W) based on W being less than 4 and may be determined to be (16/H)×H based on H being less than 4.

In the image decoding method of the present disclosure, the reconstructing the transform coefficient included in the transform subblock may be performed by scanning the transform subblocks in a predetermined scan order, and the predetermined scan order may be determined depending on whether intra prediction technique of the current block is ISP.

In the image decoding method of the present disclosure, based on the intra prediction technique of the current block being ISP, the predetermined scan order may be determined according to an ISP splitting direction of the current block.

In the image decoding method of the present disclosure, the scan order may be a horizontal order based on the ISP splitting direction of the current block being a vertical direction, and the scan order may be a vertical order based on the ISP splitting direction of the current block being a horizontal direction.

In the image decoding method of the present disclosure, the reconstructing the transform coefficient included in the transform subblock may be performed based on second information specifying whether an absolute value of the transform coefficient is greater than a predetermined value.

In the image decoding method of the present disclosure, based on the transform mode of the current block being a transform skip mode, a context model for parsing the second information may be determined depending on whether the intra prediction technique of the current block is ISP.

In the image decoding method of the present disclosure, the predetermined value may be 1 or 3.

An image decoding apparatus according to another embodiment of the present disclosure may include a memory and at least one processor. The at least one processor may determine whether a prediction mode of a current block is an intra prediction mode based on information on the prediction mode of the current block, determine whether a transform mode of the current block is a transform skip mode, determine whether an intra prediction technique of the current block is intra sub-partitions (ISP) based on the prediction mode of the current block being an intra prediction mode, and generate a transform coefficient block of the current block based on the transform mode of the current block and whether the intra prediction technique of the current block is ISP.

An image encoding method according to another aspect of the present disclosure may include determining whether a prediction mode of a current block is an intra prediction mode, determining whether a transform mode of the current block is a transform skip mode, determining whether an intra prediction technique of the current block is intra sub-partitions (ISP) based on the prediction mode of the current block being an intra prediction mode, and encoding information on a transform coefficient of the current block based on the transform mode of the current block and whether the intra prediction technique of the current block is ISP.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

According to the present disclosure, it is possible to provide a method and apparatus for encoding/decoding an image using intra sub-partitions (ISP).

According to the present disclosure, it is possible to provide a method and apparatus for encoding/decoding a residual signal, to which ISP and transform skip mode apply.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 6 is a view illustrating the structure of a bitstream of intra prediction information.

FIG. 8 is a view illustrating a bitstream structure in the case of applying a transform skip mode.

FIG. 9 is a view illustrating a decoding method using ISP and a transform skip mode according to an embodiment of the present disclosure.

FIG. 12 is a view illustrating the structure of a bitstream in the case of applying ISP and a transform skip mode according to an embodiment of the present disclosure.

FIG. 13 is a view illustrating the structure of a bitstream in the case of applying ISP and a transform skip mode according to another embodiment of the present disclosure.

MODE FOR INVENTION

Figure 1:
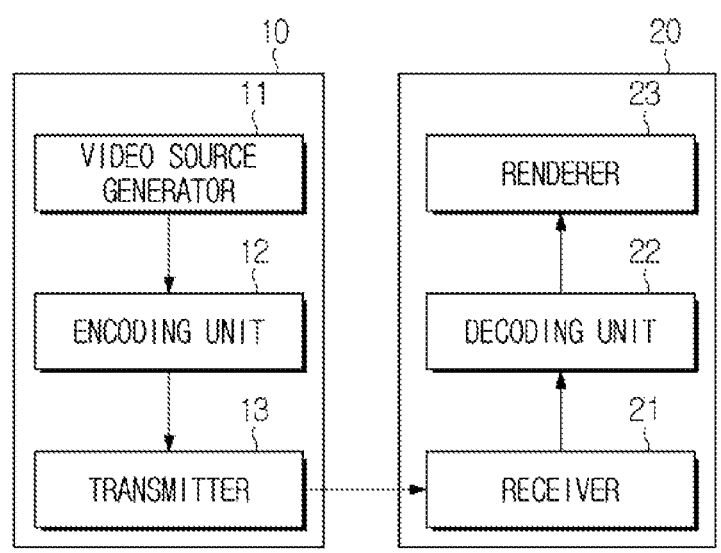
FIG. 1 is a view schematically illustrating a video coding system to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, A slash (/) or comma may be interpreted as "and/or". For example, "A/B" and "A, B" may be interpreted as "A and/or B". Also, "A/B/C" and "A, B, and C" may mean "at least one of A, B and/or C".

In the present disclosure, "or" may be construed as "and/or". For example, "A or B" may mean 1) only "A", 2) only "B", or 3) "A and B". Alternatively, in the present disclosure, "or" may mean "additionally or alternatively".

Overview of Video Coding System

FIG. 1 is a view schematically illustrating a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
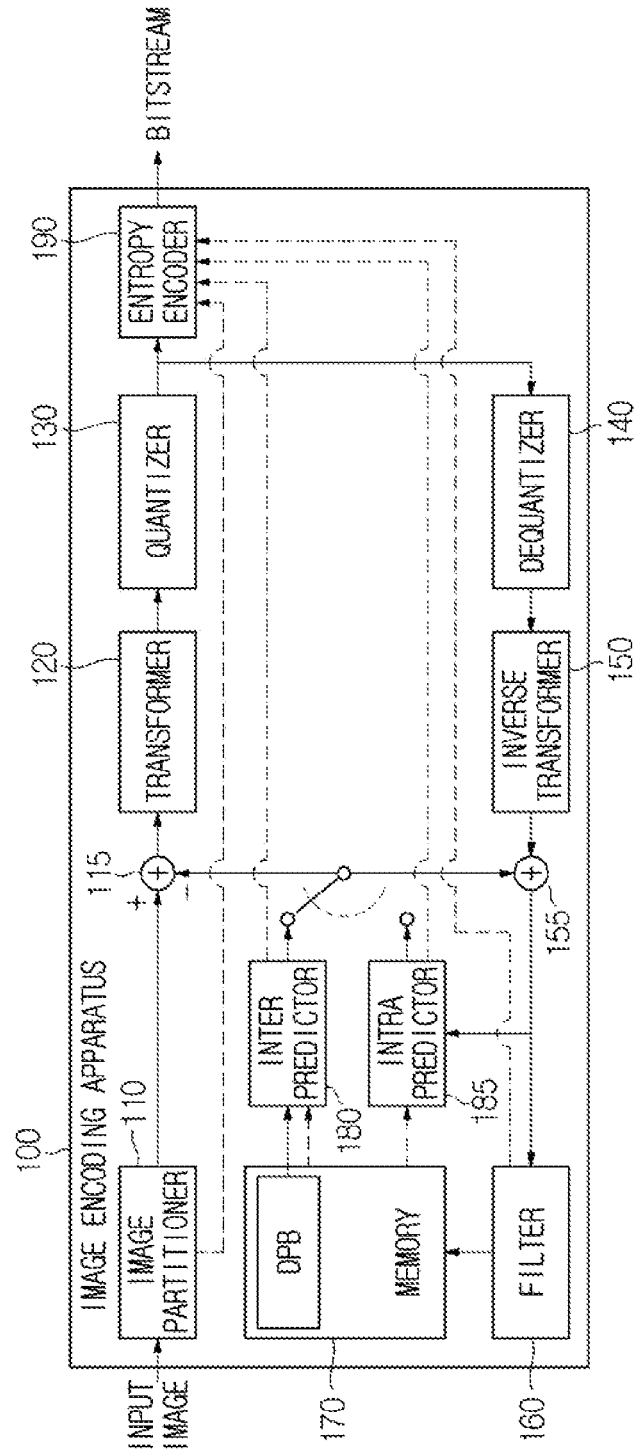
FIG. 2 is a view schematically illustrating an image encoding apparatus to which an embodiment of the present disclosure is applicable.

FIG. 2 is a view schematically illustrating an image encoding apparatus to which an embodiment of an embodiment is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CUP). In addition, the prediction unit may perform intra block copy (IBC) for prediction of the current block. Intra block copy may be used for content video/image coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described later, luma mapping with chroma scaling (LMCS) may be applied in the picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
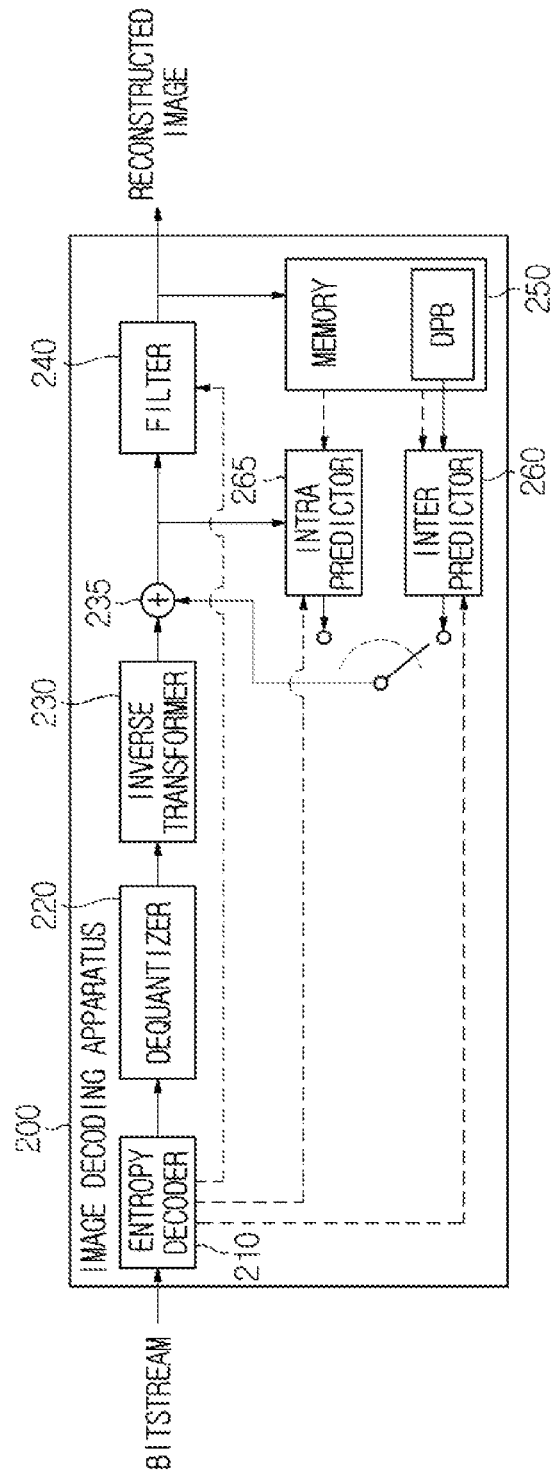
FIG. 3 is a view schematically illustrating an image decoding apparatus to which an embodiment of the present disclosure is applicable.

FIG. 3 is a view schematically illustrating an image decoding apparatus, to which an embodiment of the present disclosure is applicable As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 1. For example, the image decoding apparatus 200 may perform decoding using a processing unit applied in the image encoding apparatus. Thus, the processing unit of decoding may be a coding unit, for example. The coding unit may be a coding tree unit or may be obtained by partitioning a maximum coding unit. In addition, a reconstructed image signal decoded and output by the image decoding apparatus 200 may be reproduced through a reproduction apparatus (not shown).

The image decoding apparatus 200 may receive a signal output from the image encoding apparatus of FIG. 1 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

Meanwhile, as described later, luma mapping with chroma scaling (LMCS) may be applied in the picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present specification, the embodiments described in the filter 160, the inter prediction unit 180, and the intra prediction unit 185 of the encoding apparatus 100 may be equally or correspondingly applied to the filter 240, the inter prediction unit 260, and the intra prediction unit 265 of the image decoding apparatus 200.

Overview of Intra Prediction

Figure 4:
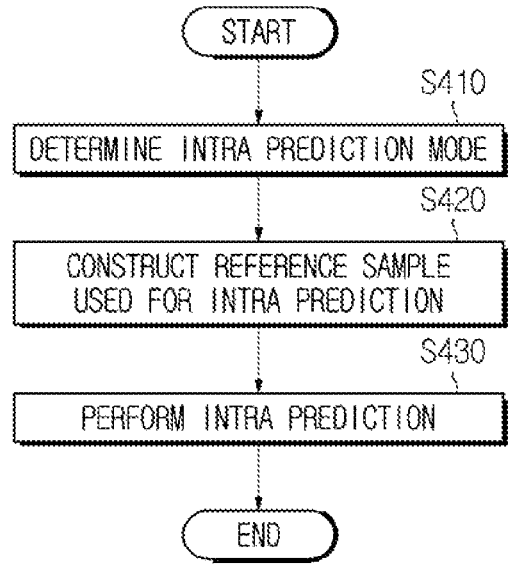
FIG. 4 is a flowchart illustrating a process of generating a prediction block (predicted block) of a current block by performing intra prediction.

FIG. 4 is a flowchart illustrating a process of generating a prediction block (predicted block) of a current block by performing intra prediction.

The process shown in FIG. 4 may be performed by the intra prediction unit 185 of FIG. 2 and/or the intra prediction unit 265 of FIG. 3.

Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples neighboring to the bottom-left, a sample adjacent to a top boundary of the current block and a total of 2×nW samples neighboring to the top-right, and one sample neighboring the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample neighboring the bottom-right of the current block.

In an image encoding apparatus, a determination of whether to perform intra prediction of FIG. 4 with respect to a current block may be made based on rate-distortion optimization (RDO). For example, when intra prediction is more efficient than inter prediction, a prediction mode for the current block may be determined to be an intra prediction mode. However, in the image encoding apparatus, a method of determining the prediction mode for the current block is not limited to the above example.

In an image decoding apparatus, a determination of whether to perform intra prediction of FIG. 4 with respect to a current block may be made based on information of the prediction mode of the current block. The information on the prediction mode of the current block may be information specifying whether the prediction mode of the current block is an intra prediction mode or an inter prediction mode. The information on the prediction mode of the current block may be explicitly signaled through a bitstream or implicitly derived based on a coding parameter for the current block.

Referring to FIG. 4, an encoding/decoding method according to an embodiment of the present disclosure may include step S410 of determining an intra prediction mode, step S420 of constructing a reference sample and/or step S430 of performing intra prediction.

Upon determining that intra prediction is performed with respect to a current block, the image encoding apparatus or the image decoding apparatus may determine the type of at least one intra prediction technique that may be used in intra prediction. In the following specification, an encoding/decoding method which may be used to perform intra prediction may be defined as an intra prediction technique. For example, the intra prediction technique may mean one of an encoding/decoding method used to determine an intra prediction mode, an encoding/decoding method used to construct a reference sample or an encoding/decoding method used to derive a prediction sample. That is, based on the determined intra prediction technique, at least one of steps S410 to S430 of FIG. 4 may be performed.

In step S410, the intra prediction mode of the current block may be determined to be one of a plurality of intra prediction modes including non-directional intra prediction modes and directional intra prediction modes. When the intra prediction mode of the current block is a non-directional intra prediction mode, a prediction sample of the current block may be derived based on an average or interpolation of neighboring reference samples of the current block. When the intra prediction mode of the current block is a directional intra prediction mode, the prediction sample of the current block may be derived based on a reference sample located in a specific (prediction) direction with respect to a sample to be predicted among the neighboring reference samples of the current block.

For example, when the intra prediction technique is a most probable mode (MPM), the intra prediction mode of the current block may be determined using the intra prediction mode of a neighboring block. For example, the image decoding apparatus may select one of MPM candidates in an MPM list derived based on the intra prediction mode and additional candidate modes of the neighboring blocks of the current block, based on an MPM index received from the image encoding apparatus. At this time, the neighboring blocks may include at least one of left and/or top neighboring blocks of the current block. Meanwhile, when the intra prediction mode of the current block is not included in the MPM list, the image decoding apparatus may determine one of intra prediction modes which are not included in the MPM list as the intra prediction mode of the current block.

As another example, when the intra prediction technique is linear interpolation intra prediction (LIP), a prediction sample of the current block may be generated through interpolation of a first neighboring sample located in the prediction direction of the intra prediction mode of the current block and a second neighboring sample located in the opposite direction thereof, based on a sample to be predicted of the current block among neighboring reference samples.

As another example, when the intra prediction technique is a linear model (LM) mode, chroma prediction samples may be generated based on luma samples using a linear model.

As another example, when the intra prediction technique is position dependent intra prediction (PDCP), a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples.

As another example, when the intra prediction technique is multi-reference line intra prediction (MRL) or MRL-based intra prediction, a reference sample line with highest prediction accuracy may be selected from among neighboring multi-reference sample lines of the current block and the prediction sample may be derived using a reference sample located in a prediction direction in the corresponding line. At this time, information (e.g., intra_luma_ref_idx) on the used reference sample line may be encoded and signaled in a bitstream.

As another example, when the intra prediction technique is intra sub-partitions (ISP) or ISP-based intra prediction, the current block may be partitioned into vertical or horizontal sub-partitions or ISP subblocks, and intra prediction may be performed with respect to each sub-partition based on the same intra prediction mode. At this time, neighboring reference samples of intra prediction may be derived in units of ISP subblocks. That is, in the encoding/decoding order, a reconstructed sample of a previous ISP subblock may be used as a neighboring reference sample of a current subblock.

The above intra prediction techniques may be referred to as various terms such as an intra prediction type or an additional intra prediction mode to be distinguished from a directional or non-directional intra prediction mode.

For example, the plurality of intra prediction techniques is not limited to the above example, some intra prediction techniques may be skipped or other intra prediction techniques may be added. For example, if necessary, an intra prediction technique for performing post-filtering with respect to the derived prediction sample may be added. In addition, the plurality of intra prediction techniques may be exclusively used or two or more intra prediction techniques may apply for the current block.

Before determining whether a predetermined intra prediction technique applies to the current block, it may be first determined whether the corresponding intra prediction technique is available for the current block. For example, it may be determined whether the corresponding intra prediction technique is available for the current block based on the coding parameter for the current block. At this time, the coding parameter may include the size (width and/or height) of the current block, a color component of the current block or whether to apply another intra prediction technique.

In addition, the determination of whether the corresponding intra prediction technique is available for the current block may be made based on information signaled at a higher level of the current block, such as a sequence, a picture, a slice or a CTU. For example, when information transmitted at a sequence level specifies that a predetermined intra prediction technique is not available, it may be determined that the corresponding intra prediction technique is not available for blocks belonging to the corresponding sequence.

Upon determining that the predetermined intra prediction technique is available for the current block, the image encoding apparatus may determine whether the corresponding intra prediction technique applies to the current block using various methods. For example, the image encoding apparatus may determine whether to apply the corresponding intra prediction technique based on RDO. The image encoding apparatus may encode and signal information on whether to apply the corresponding intra prediction technique (hereinafter referred to as intra prediction technique information) in a bitstream. The intra prediction technique information may be encoded in various forms according to the corresponding intra prediction technique.

In step S420, a reference sample to be used for intra prediction of the current block may be constructed from the neighboring reference samples of the current block.

Based on the intra prediction mode of the current block determined in step S410 and the reference sample configured in step S420, intra prediction may be performed with respect to the current block in step S430 to generate the prediction block of the current block. As described with reference to FIGS. 2 and 3, the prediction block (predicted block) of the current block may be added to the residual signal of the current block and used to generate a reconstructed signal of the current block.

Overview of Intra Sub-Partitions (ISP)

Figure 5:
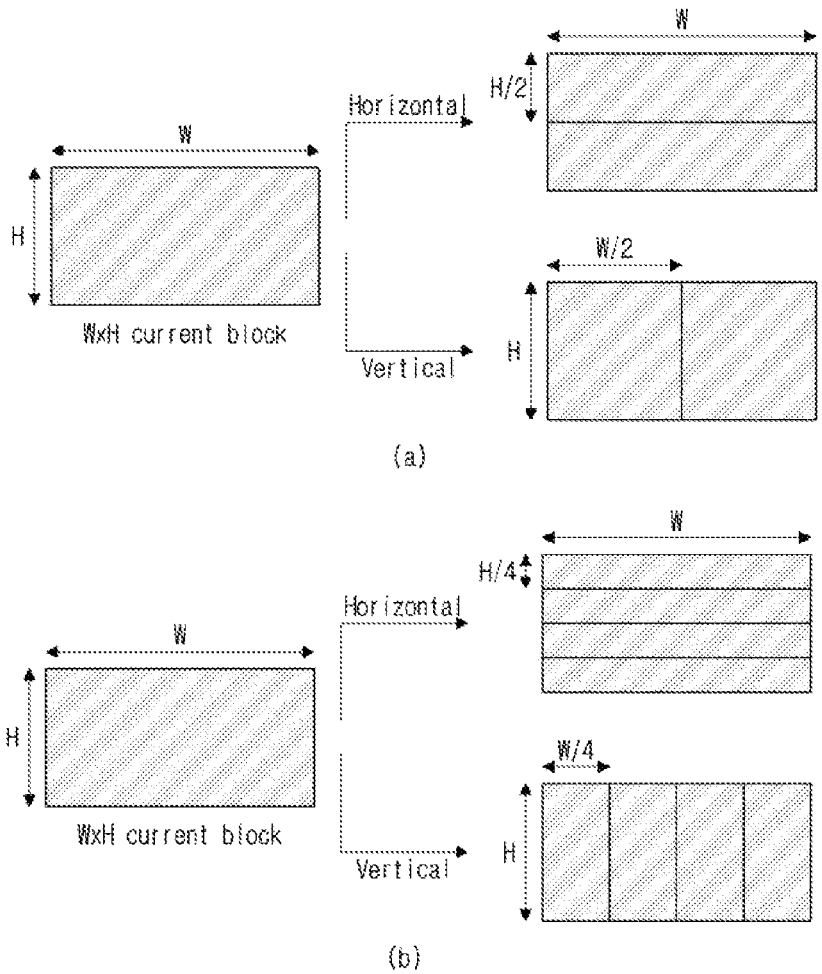
FIG. 5 is a view illustrating intra sub-partitions (ISP) among intra prediction techniques.

FIG. 5 is a view illustrating intra sub-partitions (ISP) among intra prediction techniques.

In conventional intra prediction, a current block to be encoded/decoded (current block) is regarded as one unit and encoding/decoding is performed without splitting. However, when applying ISP, the current block may be split in a horizontal or vertical direction and intra prediction encoding/decoding may be performed. At this time, encoding/decoding may be performed in units of split ISP subblocks to generate a reconstructed ISP subblock, and the reconstructed ISP subblock may be used as a reference block of a next split ISP subblock.

When an ISP mode applies to the current block, intra prediction may be performed with respect to each of ISP subblocks obtained by splitting the current block in a horizontal or vertical direction. That is, intra prediction, residual signal generation and reconstructed signal generation are performed in units of ISP subblocks, and a reconstructed signal of reconstructed sub-partition may be used as a reference sample of intra prediction of next sub-partition.

The image encoding apparatus may determine an ISP splitting direction using various methods (e.g., RDO based method). The determined splitting direction may be explicitly signaled through a bitstream as information on the ISP splitting direction. The image decoding apparatus may determine the ISP splitting direction of the current block based on information on the signaled splitting direction. When the ISP splitting direction is implicitly determined by the coding parameter of the current block, such as the size (width or height) of the current block, the image encoding apparatus and the image decoding apparatus may determine the ISP splitting direction of the current block using the same method.

Each of the ISP subblocks obtained by splitting the current block may be required to include a minimum of 16 samples. For example, when the current block is a 4×4 block, it may be implicitly determined that ISP does not apply. In addition, when the current block is a 4×8 block or 8×4 block, as shown in FIG. 5(a), the current block to which ISP applies may be split into two ISP subblocks. In addition, when the current block is not a 4×4 block, 4×8 block or 8×4 block, as shown in FIG. 5(b), the current block to which ISP applies may be split into four ISP subblocks. In the examples shown in FIGS. 5(a) and 5(b), when the ISP splitting direction is a horizontal direction, encoding and/decoding may be performed in order of a top ISP subblock to a bottom ISP subblock. In addition, when the ISP splitting direction is a vertical direction, encoding and/decoding may be performed in order of a left ISP subblock to a right ISP subblock.

FIG. 6 is a view illustrating the structure of a bitstream of intra prediction information.

Whether ISP is available for the current block may be determined based on Equation 1 below. The conditions of Equation 1 may be determined based on the luma component block of the current block. That is, under the following conditions, the width, height and position of the current block may mean the width, height and position of the luma component block of the current block, respectively.

intra_luma_ref_idx[x0][y0]==0 cbWidth<=MaxTbSizeY||cbHeight<=MaxTbSizeY cbWidth*cbHeight>MinTbSizeY*MinTbSizeY  [Equation 1]

For example, when all the above conditions for the current block are satisfied, it may be determined that ISP is available for the current block. After determining that ISP is available for the current block, it may be determined whether to apply ISP to the current block.

In the ISP availability conditions, (x0, y0) is coordinates indicating the position of the top-left sample of the current block. In addition, intra_luma_ref_idx[x0][y0] may be information indicating a reference line used for prediction of the current block. According to the ISP availability conditions, when intra_luma_ref_idx is 0, that is, when a reference line used for prediction of the current block is line 0 (a reference line immediately adjacent to the current block), it may be determined that ISP is available for the current block. When a reference line used for prediction of the current block is a line other than line 0, it may be determined that ISP is not available for the current block.

In the conditions of Equation 1 above, cbWidth and cbHeight correspond to the width and height of the current block, respectively. In addition, MaxTbSizeY and MinTbSizeY may indicate a maximum transform size and a minimum transform size, respectively. As described above, the residual processing may include transform or inverse transform. At this time, a size of a transform block in which transform or inverse transform is available may be predefined or signaled through a bitstream. That is, the maximum transform size means a maximum size of a transform block in which transform or inverse transform may be performed. In addition, the minimum transform size means a minimum size of a transform block in which transform or inverse transform may be performed. For example, when the size of the current block is greater than the maximum transform size, the current block may be split into two or more transform blocks. In addition, the current block may not be split into transform blocks having a size less than the minimum transform size. The maximum transform size and/or the minimum transform size may be predefined in the image encoding apparatus and the image decoding apparatus or may be derived based on information signaled at a higher level of a block.

According to the conditions of Equation 1 above, only when at least one of cbWidth or cbHeight is equal to or less than MaxTbSizeY, it may be determined that ISP is available for the current block. That is, when both cbWidth and cbHeight are greater than MaxTbSizeY, it may be determined that ISP is not available for the current block. When cbWidth is greater than MaxTbSizeY, cbHeight is equal to or less than MaxTbSizeY and ISP applies to the current block, an ISP splitting direction may be determined as a vertical direction as described below. When cbHeight is greater than MaxTbSizeY, cbWidth is equal to or less than MaxTbSizeY and ISP applies to the current block, an ISP splitting direction may be determined as a horizontal direction as described below.

According to the conditions of Equation 1 above, when cbWidth*cbHeight is greater than MinTbSizeY*MinTbSizeY, it may be determined that ISP is available for the current block. cbWidth*cbHeight may mean the area of the current block or the number of samples included in the current block. For example, if MinTbSizeY is 4, it may be determined that ISP is available for the current block only when the number of samples included in the current block is greater than 16(4*4).

For example, the image encoding apparatus may transmit whether to apply ISP in units of blocks. Specifically, the image encoding apparatus may signal whether to apply for the current block using a syntax element intra_ subpartions_mode_flag. For example, ISP may apply for the current block when intra_subpartions_mode_flag has a first value and ISP may not apply for the current block when intra_subpartions_mode_flag has a second value.

When ISP applies for the current block (intra_subpartions_mode_flag=1), the image encoding apparatus may signal the ISP splitting direction of the current block using the syntax element intra_subpartions_split_flag. For example, when intra_subpartions_split_flag has a first value, the ISP splitting direction of the current block may be determined to be a horizontal direction. In contrast, when intra_subpartions_split_flag has a second value, the ISP splitting direction of the current block may be determined to be a vertical direction. At this time, whether intra_subpartions_split_flag is encoded/decoded may be determined based on at least one of the size, position, maximum transform size or minimum transform size of the current block. Specifically, when the width and height of the current block are less than or equal to the maximum transform size of the current block (cbWidth<=MaxTbSizeY && cbHeight<=MaxTbSizeY), intra_subpartions_split_flag may be encoded/decoded.

When ISP applies for the current block, the intra prediction mode for the current block equally applies for all ISP subblocks and neighboring reference samples may be derived in units of ISP subblocks. As intra prediction is recursively performed using the neighboring reference sample of the ISP subblock, intra prediction performance may be improved. When ISP applies for the current block, a residual sample processing procedure may be performed in units of ISP subblocks. For example, intra prediction samples may be derived with respect to each ISP subblock, and residual samples for the corresponding subblock may be added thereto, thereby obtaining reconstructed samples.

Overview of CABAC (Context-Based Adaptive Binary Arithmetic Coding) and Residual Signal Encoding/Decoding The image encoding/decoding apparatus may encode/decode image information using CABAC. Part or all the image information may be entropy-encoded by the entropy encoding unit 190 of FIG. 2, and part or all of the image may be entropy-decoded by the entropy decoding unit 210. Syntax elements included in a residual to be described later may be entropy-encoded/decoded based on CABAC.

Figure 7:
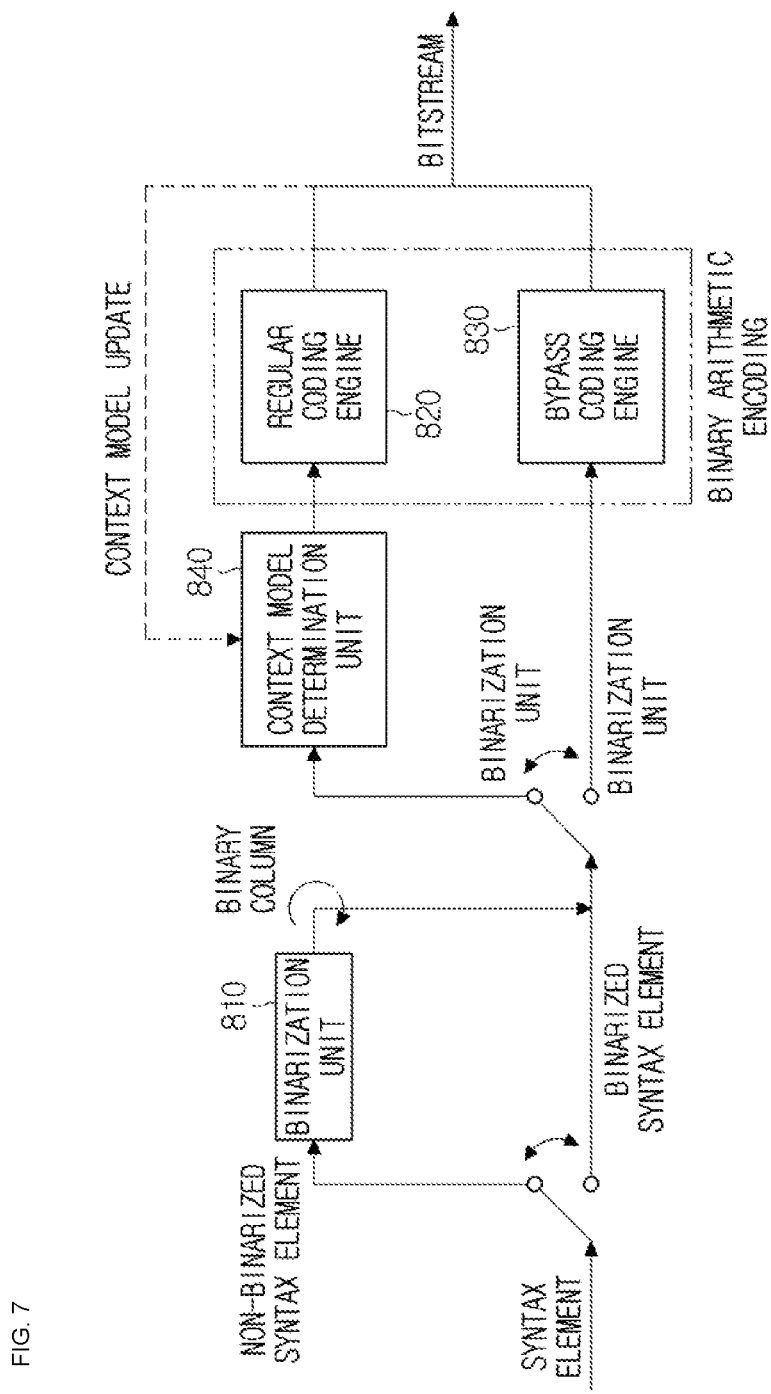
FIG. 7 is a view illustrating a CABAC entropy encoding method.

FIG. 7 is a view illustrating a CABAC entropy encoding method.

When an input signal is a syntax element having a non-binary value, the input signal may be converted into a binary value through a binarization unit 810. When the input image already has a binary value, the binarization process may not be performed. In this case, each binary number 0 or 1 constituting the binary value may be referred to as a bin. For example, when a binary sequence after binarization is 110, each of 1, 1 and 0 may be one bine. Binary or binary sequence for one syntax element may represent a value of the corresponding syntax element.

Binarized bins may be input to a regular coding engine 820 or a bypass coding engine 830. A context model determination unit 840 may assign a context model reflecting a probability value to a corresponding bin, and the regular coding engine 820 may code the corresponding bin based on the assigned context model. After each bin is coded in the regular coding engine 820, the probability model for the corresponding bin may be updated. The encoded bins may be context-coded bins. In the bypass coding engine 830, a procedure for estimating a probability with respect to the input bin and a procedure for updating the probability model which has applied to the corresponding bin may be omitted. The bypass coding engine 830 may code the input bin by applying a uniform probability distribution instead of assigning a context, thereby improving a coding rate. The bins coded through the bypass coding engine 830 may be referred to as bypass bins.

The entropy encoder 190 may determine whether to perform coding through the regular coding engine 820 or whether to perform coding through the bypass coding engine 830 and switch a coding path.

Meanwhile, entropy coding may be performed in the reverse order of the coding process of FIG. 7. The entropy decoder 210 may decode a bitstream into a binary sequence using one of a regular coding decoding engine or a bypass decoding engine. After decoding is performed in the regular decoding engine, the probability model for the corresponding bin may be updated. Meanwhile, in the bypass decoding engine, a procedure for estimating a probability with respect to the input bin and a procedure for updating the probability model may be omitted. The bin generated through one of the regular coding decoding engine or the bypass decoding engine may be finally reconstructed to a syntax element which is a first input signal through selective inverse binarization of an inverse binarization unit.

Residual samples may be derived using transform coefficients quantized through a transform and quantization process. The quantized transform coefficients may be defined as transform coefficients. Transform coefficients in the block may be signaled in the form of residual information. Residual information may include a residual coding syntax element. The image encoding apparatus may construct a residual coding syntax element with the residual information and encode and output it in the form of a bitstream. In contrast, the image decoding apparatus may obtain the quantized transform coefficients by decoding the residual coding syntax element from the bitstream. Hereinafter, the residual coding syntax element may be referred to as a syntax element.

For example, the transform coefficient may be coded/decoded using at least one residual coding syntax element of last_sig_coeff_x_prefix, last_sig_coeff_y_prefix, last_sig_coeff_x_suffix, last_sig_coeff_y_suffix, coded_sub_block_flag, sig_coeff_flag, abs_level_gtX_flag, par_level_flag, abs_remainder or dec_abs_level, coeff sign_flag. A process of coding/decoding the transform coefficient using the syntax element may be defined as residual (data) coding or (transform) coefficient coding. In this case, the transform/quantization process may be omitted. Hereinafter, each of the above-described syntaxes will be described in detail. The names of the syntax elements described below are examples and the scope of the present disclosure is not limited by the names of the syntax elements.

The syntax elements last_sig_coeff_x_prefix, last_sig_coeff_y_prefix, last_sig_coeff_x_suffix and last_sig_coeff_y_suffix are syntax elements for coding (x, y) position information of a final non-zero coefficient in an associated block. In this case, the associated block may be a coding block (CB) or a transform block (TB). Hereinafter, a block in the transform, quantization and residual coding process may be a coding block or a transform block.

Specifically, last_sig_coeff_x_prefix may specify a prefix of a column position of a last significant coefficient in the scan order in the transform block, and last_sig_coeff_y_prefix may specify a prefix of a row position of the last significant coefficient in the scan order in the transform block. last_sig_coeff_x_suffix may specify a suffix of a column position of a last significant coefficient in the scan order in the transform block, and last_sig_coeff_y_ suffix may specify a suffix of a row position of the last significant coefficient in the scan order in the transform block. The significant coefficient may mean a non-zero coefficient. The scan order may be one of a top-right diagonal scan order, a horizontal scan order and a vertical scan order. In this case, the horizontal scan order may mean the scan order from the left to the right, and the vertical scan order may mean the scan order from the top to the bottom. The scan order may be determined based on whether intra/inter prediction applies to a target block and/or a detailed intra/inter prediction mode.

The syntax element coded_sub_block_flag may specify whether each subblock includes a non-zero coefficient when the current block is partitioned into 4∈4 subblocks. In this case, the subblock may be represented by a coefficient group (CG).

For example, when the value of coded_sub_block_flag is 0, since there is no more information to be transmitted, the coding process of the subblock may end. In contrast, when the value of coded_sub_block_flag is 1, a process of coding/decoding sig_coeff_flag may be performed. According to the scan order, signaling of coded_sub_block_flag may not be performed with respect to a subblock including a last non-zero coefficient. This may be because, in a top left subblock, since there is a DC coefficient, a probability that there is a non-zero coefficient is high. Accordingly, coded_sub_block_flag may not be coded with respect to a subblock including a last non-zero coefficient and the value thereof may be set to 1.

When coded_sub_block_flag specifies that there is a non-zero coefficient in a current subblock, sig_coeff_flag having a binary value may be coded/decoded tin he reversely scanned order. A 1-bit syntax element sig_coeff_flag[n] may be coded/decoded with respect to the coefficient at the corresponding scan position n according to the scan order. A syntax element sig_coeff_flag[n] may specify whether the coefficient at the current scan position has a value of 0. In the case of a subblock including a last non-zero coefficient, sig_coeff_flag[n] does not need to be coded/decoded with respect to the last non-zero coefficient and thus a coding/decoding process may be skipped.

Only when sig_coeff_flag[n] is 1, level information coding/decoding may be performed. In this case, the level information coding/decoding process may be performed using at least one of the above-described syntax elements. Meanwhile, the syntax element sig_coeff_flag[xC][yC] may specify whether the transform coefficient at each transform coefficient position (xC, yC) in the current block is 0.

The remaining level value after coding/decoding sig_coeff_flag[n] may be derived according to Equation 2 below.

remAbsLevel[n]=|coeff[n]|−1 [Equation 2]

In this case, a syntax element remAbsLevel[n] may specify a level value to be coded/encoded at a scan position n. coeff[n] may mean an actual transform coefficient value.

A syntax element abs_level_gtx_flag[n][0] may specify whether remAbsLevel[n] at the scan position n is greater than 1. When the value of abs_level_gtX_flag[n][0] is 0, the absolute value of the coefficient at the corresponding position may be 1. In contrast, when the value of abs_level_gtX_flag[n][0] is 1, remAbsLevel[n] may be derived according to Equation 3 below.

remAbsLevel[n]=remAbsLevel[n]−1 [Equation 3]

A syntax element par_level_flag[n] may be used to code/decode a least significant coefficient (LSB) value of remAbsLevel[n] according to Equation 4 below. That is, par_level_flag[n] may specify a parity of a transform coefficient level value at the scan position n. After coding/decoding par_leve_flag[n], remAbsLevel[n] may be updated according to Equation 4 below.

par_level_flag[n]=remAbsLevel[n]& 1 remAbsLevel[n]=remAbsLevel[n]>>1 [Equation 4]

A syntax element abs_level_gtx_flag[n][1] may specify whether remAbsLevel[n] at the scan position n is greater than 3. For example, only when abs_level_gtX_flag[n][1] is 1, abs_remainder[n] may be coded/decoded. For example, a relationship between coeff[n] and each syntax element may be expressed as shown in Equation 5 below. In this case, |coeff[n]| may specify a transform coefficient level value and may be expressed as AbsLevel[n] for the transform coefficient. A syntax element coeff sign_flag[n] may specify the sign of the transform coefficient at the corresponding scan position n. In summary, abs_level_gtx_flag[n][i] may be a syntax element specifying whether the absolute value of the transform coefficient is greater than any one of 1 or 3.

|coeff[n]|=sig_coeff_flag[n]+abs_level_gtX_flag[n][0]+par_level_flag[n]+2*(abs_level_gtx _flag[n][1]+abs_remainder[n]) [Equation 5]

Meanwhile, CABAC provides high performance, but has a disadvantage that throughput performance is not good. This may be due to the regular coding engine of CABAC. The regular coding engine uses a probability state and range updated through coding of a previous bin and thus has high data dependency and has a problem that it takes considerable time to read a probability section and to determine a current state. In this case, when the number of context-coded bins is limited, the CABAC throughput problem may be solved.

For example, a sum of bins used to express sig_coeff_flag[n], abs_level_gtX_flag[n][0], par_level_flag[n] and abs_level_gtx_flag[n][1] may be limited according to the size of the subblock. For example, the sum of the bins may be limited to a value of ((1<<(log 2TbWidth+log 2TbHeight))*7)>>2. For example, the sum of the bins may be limited to a value of 1.75 times the size of the transform block including a current CG. This may mean that 1.75 context-coded bins may be used for one pixel position on average. When all a limited number of context-coded bins are used, CABAC may not apply to the remaining coefficients and bypass coding/decoding may be performed. That is, when the number of coded/decoded bins is 32 in a 4×4 CG and is 8 in a 2×2 C, sig_coeff_flag[n], abs_level_gtX_flag[n] [0], par_level_flag[n], abs_level_gtx_flag[n][1] may not be additionally coded. In this case, |coeff[n]| may be coded/decoded into a preset dec_abs_level[n].

Overview of Residual Signal Coding/Decoding According to Transform Skip Mode

As described above, the transformer 120 of the image encoding apparatus may perform transform with respect to a residual signal to generate transform coefficients. The transform coefficients may be signaled to the image decoding apparatus through the quantization and entropy encoding, and the inverse transformer 230 of the image decoding apparatus may perform inverse transform with respect to the transform coefficients to reconstruct the transform coefficients. In a special case, the image encoding apparatus may perform entropy encoding without performing transform with respect to the residual signal. Such operation of the image encoding apparatus may be defined as application of a transform skip process or a transform skip mode. The inverse transformer 230 of the image decoding apparatus may not perform inverse transform with respect to the residual signal whose transform is skipped.

The image encoding apparatus may transmit information specifying whether the transform skip mode applies to the current block. For example, the image encoding apparatus may signal whether the transform skip mode applies to the current block through a syntax element transform_skip_flag. transform_skip_flag may be signaled based on at least one of the height, width or maximum transform size of the current block. For example, whether to encode/decode transform_skip_flag of the current block may be determined according to the condition of Equation 6 below.

$$\text{transform\_skip\_enabled\_flag \&\& log}$$
$$\text{2TbWidth}<=\text{MaxTsSize \&\& log}$$
$$\text{2TbHeight}<=\text{MaxTsSize} \qquad [\text{Equation 6}]$$

At this time, transform_skip_enabled_flag may be a syntax element specifying whether to apply the transform skip mode, and may be signaled at at least one level of a sequence level, a picture level, a tile level, a tile group level or a slice level.

When the transform skip mode applies to the current block, encoding/decoding of the above-described residual signal may be performed according to the following characteristics.

When applying the transform skip mode, since energy compression by transform does not occur, transmission of a last significant coefficient may not be required. That is, when applying transform skip, information on the last significant coefficient may not be signaled. In addition, since energy compression by transform does not occur, a diagonal scan method from the top left to the bottom right according to a prediction mode. In this case, information on a subblock including the last significant coefficient may not be signaled. Meanwhile, since the scanning order is different from a residual signal to which transform applies, a block which is first encoded/decoded may be a top-left subblock of the current block.

When applying transform skip, since a non-zero significant coefficient may be generated in all subblocks, a syntax element coded_sub_block_flag may be encoded/decoded for all subblocks. In addition, context for encoding/decoding of the syntax element coded_sub_block_flag may be changed. For example, context for encoding/decoding of coded_sub_block_flag may be determined using a sum or a logical sum of coded_sub_block_flag of the left sample and the top sample of the current block.

FIG. 8 is a view illustrating a bitstream structure in the case of applying a transform skip mode.

FIGS. 8a to 8c show a residual signal bitstream structure in the case of applying a transform skip mode for a current block. The bitstream structures of FIGS. 8a to 8c are examples of the present disclosure and the scope of the present disclosure are not limited by the figures.

Residual Signal Encoding/Decoding According to Application of Transform Skip Mode and ISP Hereinafter, a method of encoding/decoding a residual signal when a transform skip mode and ISP apply for a current block will be described in detail.

FIG. 9 is a view illustrating a decoding method using a transform skip mode and ISP according to an embodiment of the present disclosure.

Referring to FIG. 9, the decoding method using the transform skip mode and ISP may include step S910 of determining whether a prediction mode of the current block is an intra prediction mode, step S920 of determining whether a transform mode of the current block is a transform skip mode, step S930 of determining whether an intra prediction technique of the current block is intra sub-partitions (ISP) when the prediction mode of the current block is an intra prediction mode and/or step S940 of generating a transform coefficient block of the current block based on the transform mode of the current block and whether the intra prediction technique of the current block is ISP.

Figure 10:
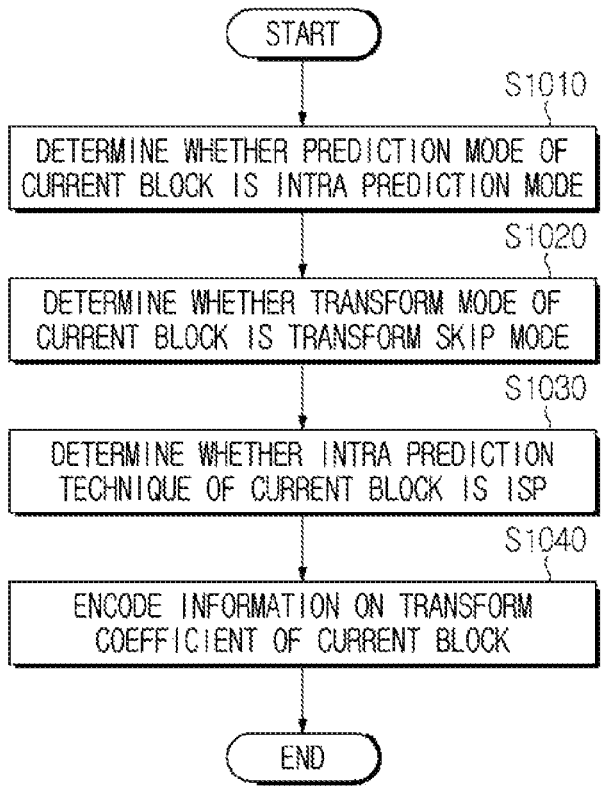
FIG. 10 is a view illustrating an encoding method using ISP and a transform skip mode according to an embodiment of the present disclosure.

FIG. 10 is a view illustrating an encoding method using ISP and a transform skip mode according to an embodiment of the present disclosure.

Referring to FIG. 10, the encoding method using the transform skip mode and ISP may include step S1010 of determining whether a prediction mode of a current block is an intra prediction mode, step S1020 of determining whether a transform mode of the current block is a transform skip mode, step S1030 of determining whether an intra prediction technique of the current block is intra sub-partitions (ISP) when the prediction mode of the current block is an intra prediction mode, and step S1040 of encoding information on a transform coefficient of the current block based on the transform mode of the current block and whether the intra prediction technique of the current block is ISP.

In the following embodiments, a method of encoding/decoding a residual signal for encoding/decoding of a transform coefficient when the transform skip mode and ISP apply to the current block will be described in detail.

Embodiment #1: Context Model Determination Method

According to an embodiment of the present disclosure, when ISP and a transform skip mode apply for a current block, an image encoding/decoding apparatus may encode/decode a residual signal using a context model different from a conventional context model.

When ISP applies for the current block, since a distance between a current sample and a reference sample is close compared to a conventional intra prediction technique, more accurate intra prediction may be performed. Due to higher prediction precision, a residual signal may have a lower residual level. In particular, when transform skip applies for the current block, since the residual characteristics of a pixel domain are maintained, more efficient encoding/decoding may be performed when a separate context model is used. That is, when a residual signal of a block to which a transform skip mode applies is encoded/decoded using a context model effective for a low residual level, improved encoding/decoding efficiency may be obtained compared to the related art. In addition, according to the present embodiment, since statistical characteristics different from a conventional intra prediction residual signal may be accumulated, encoding efficiency may be further improved. In the following description, a context element may mean a syntax element which is regularly coded based on context.

In order to determine a context model of a specific syntax element, a context initialization process may be performed. The context initialization process may mean a process of selecting a context model table ctxTable determined according to a type of a syntax element and initializing a context model for the corresponding syntax element using an initialization value initValue defined in a table. Specifically, which initialization value is used may be determined using a bin index binIdx specifying the position of a bin in a bin string and a context model index ctxIdx derived using neighboring block information, etc. At this time, ctxIdx may be determined using a sum of a context model offset ctxIdxOffset and a context model increment value ctxInc. That is, a context model used for encoding/decoding of a specific syntax element may be determined according to a ctxInc value.

Figure 11:
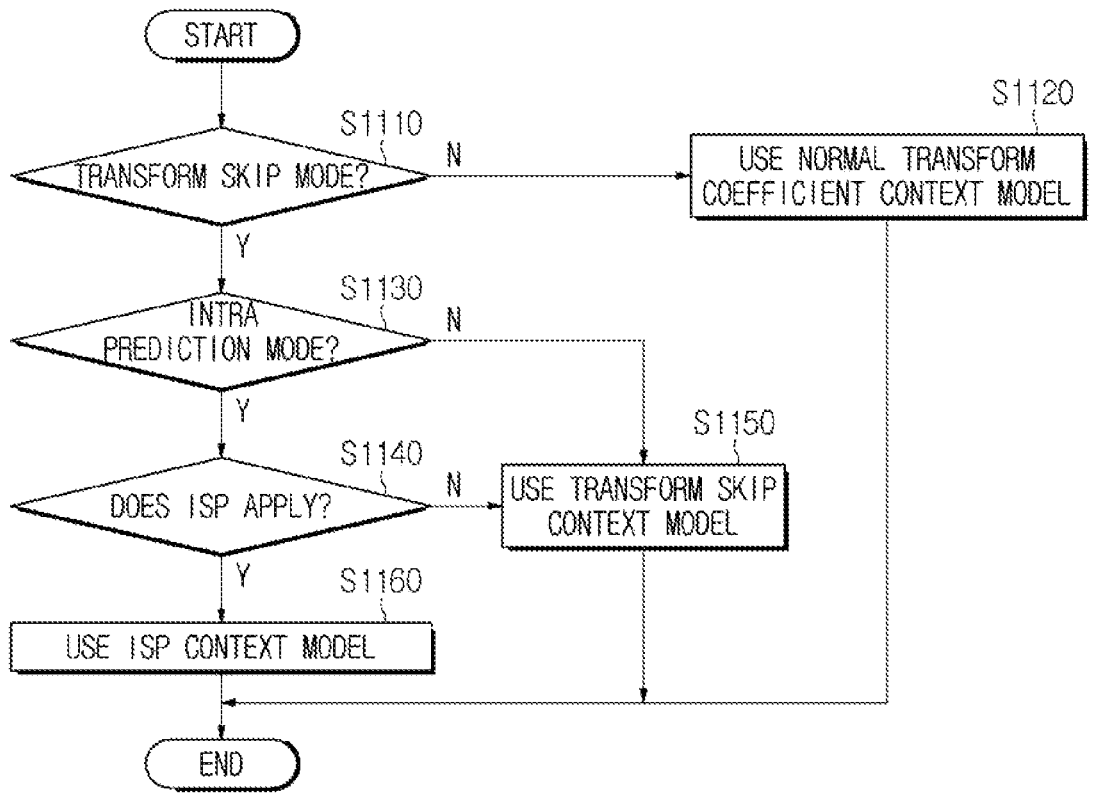
FIG. 11 is a view illustrating a context model determination method according to an embodiment of the present disclosure.
Figure 14:
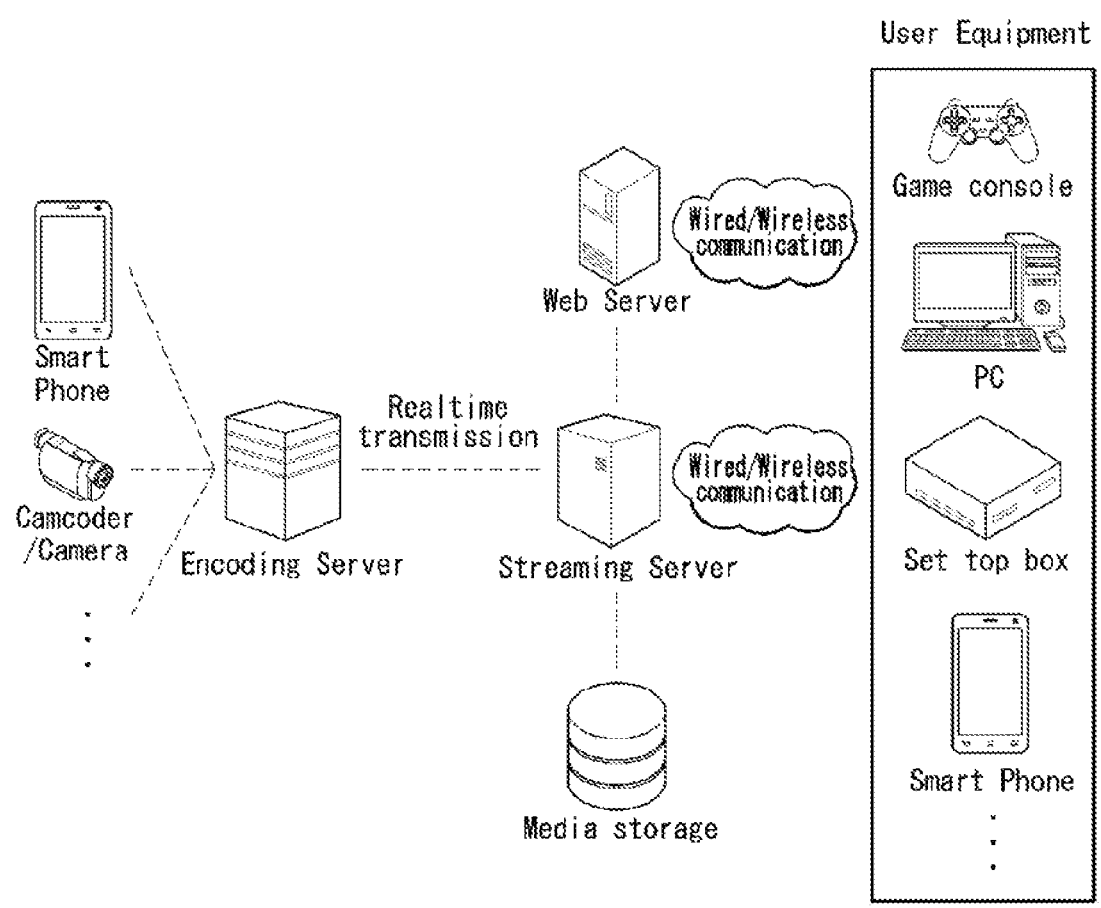
FIG. 14 is a view illustrating a content streaming system, to which an embodiment of the present disclosure is applicable.

FIG. 11 is a view illustrating a context model determination method according to an embodiment of the present disclosure.

According to an embodiment of the present disclosure, a context model for encoding/decoding of a first syntax element may be determined. Hereinafter, the first syntax element may mean one of syntax elements included in a residual signal. For example, the first syntax element may be abs_level_gtx_flag. Although a method of determining a context model for encoding/decoding of the syntax element abs_level_gtx_flag will be described later, context models for other syntax elements included in the residual signal may also be determined by the same method.

Referring to FIG. 11, it may be determined whether a transform skip mode applies for a current block (S1110). When the transform skip mode applies for the current block, the first syntax element may be encoded/decoded using a conventional normal transform coefficient context model (S1120). Meanwhile, when the transform skip mode applies for the current block, it may be determined whether a prediction mode of the current block is an intra prediction mode (S1130). When the prediction mode of the current block is not an intra prediction mode, the first syntax element may be encoded/decoded using a transform skip context model (S1150). Meanwhile, upon determining that the prediction mode of the current block is an intra prediction mode, it may be determined whether ISP applies for the current block (S1140). When the prediction mode of the current block is an intra prediction mode but the intra prediction technique of the current block is not ISP, the first syntax element may be encoded/decoded using the transform skip context model (S1150). Meanwhile, when the intra prediction technique of the current block is ISP, the first syntax element may be encoded/decoded using an ISP context model. Hereinafter, the above-described transform skip context model and ISP context model will be described in detail.

A context model for encoding/decoding of a syntax element abs_level_gtx_flag[n][i] may be determined by the above-described ctxInc. At this time, n may be a value specifying the position of a current sample.

When the transform mode of the current block is a transform skip mode, the prediction mode of the current block is an intra prediction mode and the intra prediction technique of the current block is not ISP, ctxInc for encoding/decoding of abs_level_gtx_flag[n][i] may be determined according to Equation 6 below. For example, when a syntax element transform_skip_flag[x0][y0] has a value of 1 and a syntax element intra_subpartitions_mode_flag[x0][y0] has a value of 0, ctxInc used to derive a context model for encoding/decoding of abs_level_gtx_flag[n] [i] may be determined according to Equation 7 below.

$$\text{ctxInc}=65+i \qquad \text{[Equation 7]}$$

Meanwhile, when the transform mode of the current block is a transform skip mode, the prediction mode of the current block is an intra prediction mode and the intra prediction technique of the current block is ISP, ctxInc for encoding/decoding of abs_level_gtx_flag[n] [i] may be determined according to Equation 8 or 9 below. For example, when transform_skip_flag[x0][y0] has a value of 1 and a syntax element intra_subpartitions_mode_flag[x0][y0] has a value of 1, ctxInc used to derive a context model for encoding/decoding of abs_level_gtx_flag[n] [i] may be determined according to Equation 8 or 9 below.

$$\text{ctxInc}=65+\text{numGtXFlags}+i \qquad \text{[Equation 8]}$$

$$\text{ctxInc}=68+\text{numGtXFlags}+i \qquad \text{[Equation 9]}$$

At this time, numGtXFlags may mean the number of types of abs_level_gtx_flag which may be used upon encoding/decoding. For example, numGtXFlags may be 5. When numGtXFlags is 5, for encoding/decoding of an image, a total of five abs_level_gtx_flag syntax elements including abs_level_gtx_flag[n] [0], abs_level_gtx_flag[n] [1], abs_level_gtx_flag[n][2], abs_level_gtx_flag[n] [3] and abs_level_gtx_flag[n] [4] may be used.

Meanwhile, when the transform skip mode does not apply for the current block, a context model for encoding/decoding of the first syntax element may be determined according to a conventional method. For example, when a current scan position is equal to the position of a last significant coefficient, ctxInc used to derive the context model for encoding/decoding of the first syntax element may be determined according to Equation 10 below. Hereinafter, cIdx may be a syntax element specifying the component type (luma or chroma) of the first syntax element. For example, when the value of cIdx is 0, the component of the corresponding syntax element may be a luma component and, when the value of cIdx is not 0, the component of the corresponding syntax element may be a chroma component.

$$\text{ctxInc}=(\text{cIdx}==0\,?\,0:21) \qquad \text{[Equation 10]}$$

When the current scan position is not equal to the position of the last significant coefficient and cIdx is 0, ctxInc used to derive the context model for encoding/decoding of the first syntax element may be determined according to Equation 11 below. Hereinafter, ctxOffset may be a value derived through a sum of significant coefficients and the number of significant coefficients included in the neighboring scan positions of the current scan position. In addition, d may be a sum of the x-coordinate and y-coordinate of the current scan position.

$$\text{ctxInc}=1+\text{ctxOffset}+(d==0\,?\,15:(d<3\,?\,10:(d<10\,?\,5:0))) \qquad \text{[Equation 11]}$$

When the current scan position is not equal to the position of the last significant coefficient and cIdx is not 0, ctxInc used to derive the context model for encoding/decoding of the first syntax element may be determined according to Equation 12 below.

$$\text{ctxInc}=22+\text{ctxOffset}+(d==0\,?\,5:0) \qquad \text{[Equation 12]}$$

That is, according to the present embodiment, depending on whether the transform skip mode applies to the current block and/or whether the intra prediction technique of the current block is ISP, ctxInc used to derive the context model for encoding/decoding of the first syntax element may be determined differently. According to the present embodiment, the image encoding/decoding apparatus may efficiently determine the context model for encoding/decoding of the syntax element in consideration of the transform mode of the current block and whether to apply ISP.

Embodiment #2: Size of Transform Subblock and Scan Order Determination Method

According to an embodiment of the present disclosure, when the transform mode of the current block is a transform skip mode, the prediction mode of the current block is an intra prediction mode and the intra prediction technique of the current block is ISP, a size of a transform subblock or a coefficient group may be determined differently from the size of a conventional transform subblock or coefficient group. Hereinafter, the transform subblock and the coefficient group may be used as the same meaning.

When the intra prediction technique of the current block is ISP, the current block may be split into a plurality of ISP subblocks. At this time, a problem that the size of a transform subblock obtained by further splitting the ISP subblock may not be defined as 4×4 or 2×2 which is a normal transform block size may occur. According to the present embodiment, when the intra prediction technique of the current block is ISP, the size of the transform subblock may be determined according to the size of the ISP subblock as shown in Table 1 below.

TABLE 1

| Size of ISP subblock | Size of transform subblock |
| --- | --- |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| Other M × N blocks | 4 × 4 |

Referring to Table 1, when the width of the ISP subblock is W and the height thereof is H, the size of the transform subblock may be determined as follows. For example, when W is less than 4, the size of the transform subblock may be determined to be W×(16/W). In addition, when H is less than 4, the size of the transform subblock may be determined to be (16/H)×H.

In addition, according to another embodiment of the present disclosure, when the transform mode of the current block is a transform skip mode, the prediction mode of the current block is an intra prediction mode and the intra prediction technique of the current block is ISP, the scan order of the transform subblocks or coefficient groups may be determined differently from the scan order of the conventional transform subblocks or coefficient groups.

When the intra prediction technique of the current block is ISP, the current block may be split into ISP subblocks and each ISP subblock may be further split into a plurality of transform subblocks. At this time, the scan order of the plurality of transform subblocks may be determined differently from the scan order of the conventional transform blocks. For example, the scan order of the transform subblocks may be determined to be a predetermined scan order according to the ISP splitting direction of the current block. For example, when the ISP splitting direction of the current block is a vertical direction (vertical splitting), the predetermined scan order may be a left-to-right order or a horizontal order. In addition, when the ISP splitting direction of the current block is a horizontal direction (horizontal splitting), the predetermined scan order may be a top-to-bottom order or a vertical order.

FIG. 12 is a view illustrating the structure of a bitstream in the case of applying ISP and a transform skip mode according to an embodiment of the present disclosure.

For example, the size and scan order of the transform subblocks to which ISP and the transform skip mode apply may be determined, through the bitstream structure of FIG. 12. The bitstream structure of FIG. 12 may be an improvement of the bitstream structure of FIG. 8. Underlines of FIG. 12 may indicate changed or added portions compared to the bitstream structure of FIG. 8. In the following description, the current block may mean the above-described ISP subblock.

First, the size of the transform subblock may be determined through FIG. 12a. In FIG. 12a, the width of the current block may be expressed by TbWidth, and the height thereof may be expressed by TbHeight. In addition, the width of the transform subblock may be expressed by SbW, and the height thereof may be expressed by SbH. According to the bitstream structure of FIG. 12a, it may be determined whether at least one of TbWidth or TbHeight is less than 4. When both TbWidth and TbHeight are equal to or greater than 4, both SbW and SbH may be determined to be 4 (log 2SbH=log 2SbW=2). That is, the size of the transform subblock may be determined to be 4×4.

In contrast, when at least one of TbWidth or TbHeight is less than 4 and the component is a luma component (cIdx=0), the size of the transform subblock may be determined as follows. For example, when TbWidth is less than 4, log 2SbW and log 2SbH may be determined to be log 2TbWidth and 4−log 2TbWidth, respectively. In addition, when TbHeight is less than 4, log 2SbW and log 2SbH may be determined to be 4−log 2TbHeigt and log 2TbHeight, respectively. That is, according to FIG. 12a, the size of the transform subblock may be determined as shown in Table 1 above.

Next, a syntax element coded_sub_block_flag may be encoded/decoded through the bitstream structure of FIG. 12b. In addition, at least one of syntax elements sig_coeff_flag, coeff sign_flag, abs_level_gtx_flag or par_level_flag may be encoded/decoded through the bitstream structure of FIG. 12c. In addition, a syntax element abs_remainder may be encoded/decoded through the bitstream structure of FIG. 12d. Referring to FIGS. 12b to 12d, the scan order (or direction) of the current block may be determined by a matrix DiagScanOrder for a predetermined scan order, whether to apply transform, and the size of the transform subblock. According to FIGS. 12b to 12d, when the transform subblock is generated in a vertically split form, the scan order may be a horizontal order. In contrast, when the transform subblock is generated in a horizontally split form, the scan order may be a vertical order.

Embodiment #3: Syntax Element Parsing Method

According to an embodiment of the present disclosure, when the transform mode of the current block is a transform skip mode, the prediction mode of the current block is an intra prediction mode and the intra prediction technique of the current block is ISP, parsing of a specific syntax element may be omitted or skipped. For example, parsing of the first syntax element may be omitted or skipped. For example, the first syntax element may be coded_sub_block_flag.

When the transform mode of the current block is a transform skip mode, since a probability that a transform coefficient is present in the current block is high, coded_sub_block_flag of the current block is not signaled and may always be determined to be a first value. That is, when the transform mode of the current block is determined to be a transform skip mode, the image encoding apparatus may not encode coded_sub_block_flag. Meanwhile, when the transform mode of the current block is determined to be a transform skip mode, the image decoding apparatus may not parse coded_sub_block_flag and set the value thereof to a first value. For example, the first value may be 1. That is, when the transform mode of the current block is a transform skip mode and the intra prediction technique of the current block is ISP, parsing of coded_sub_block_flag may be skipped. The image decoding apparatus may determine that all transform blocks of the current block include a non-zero transform coefficient. According to the present embodiment, since utilization of bins for encoding/decoding of a syntax element coded_sub_block_flag may be saved, encoding/decoding efficiency may increase.

FIG. 13 is a view illustrating the structure of a bitstream in the case of applying ISP and a transform skip mode according to another embodiment of the present disclosure.

FIG. 13b may be an example of improving the bitstream structure of FIG. 13a. In particular, FIG. 13b may be equal to FIG. 12b. Specifically, FIG. 13b may show a bitstream structure obtained by deleting a block indication portion from the bitstream structure of FIG. 13a. According to FIG. 13b, when the transform skip mode and ISP apply for the current block, encoding/decoding of a syntax element coded_sub_block_flag may be skipped.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

FIG. 13 is a view showing a content streaming system, to which an embodiment of the present disclosure is applicable.

As shown in FIG. 13, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
determining whether a prediction mode of a current block is an intra prediction mode, based on information on the prediction mode of the current block;

determining whether a transform mode of the current block is a transform skip mode;

determining whether an intra prediction technique of the current block is intra sub-partitions (ISP), based on the prediction mode of the current block being the intra prediction mode; and generating a transform coefficient block of the current block, based on the transform mode of the current block and whether the intra prediction technique of the current block is ISP, wherein the generating the transform coefficient block comprises:

splitting the transform coefficient block of the current block into transform subblocks having a predetermined size; and reconstructing a transform coefficient included in a transform subblock by decoding information on the transform coefficient included in the transform subblock, wherein the reconstructing the transform coefficient included in the transform subblock is performed based on first information specifying whether a non-zero transform coefficient is included in the transform subblock, and wherein, based on the transform mode of the current block being the transform skip mode and the intra prediction technique of the current block being the ISP, parsing of the first information is skipped, and the first information is set to specify that the transform subblock includes the non-zero transform coefficient.

2. The image decoding method of claim 1, wherein a width and a height of the transform subblock are determined based on whether the intra prediction technique of the current block is the ISP.

3. The image decoding method of claim 2, wherein, based on the intra prediction technique of the current block being the ISP, when the width of the current block is W and the height thereof is H, a size of the transform subblock is determined to be W×(16/W) based on the W being less than 4 and is determined to be (16/H)×H based on the H being less than 4.

4. The image decoding method of claim 1,
wherein the reconstructing the transform coefficient included in the transform subblock is performed by scanning the transform subblocks in a predetermined scan order, and
wherein the predetermined scan order is determined depending on whether intra prediction technique of the current block is the ISP.

5. The image decoding method of claim 4, wherein, based on the intra prediction technique of the current block being the ISP, the predetermined scan order is determined according to an ISP splitting direction of the current block.

6. The image decoding method of claim 5,
wherein the scan order is a horizontal order, based on the ISP splitting direction of the current block being a vertical direction, and
wherein the scan order is a vertical order, based on the ISP splitting direction of the current block being a horizontal direction.

7. The image decoding method of claim 1, wherein the reconstructing the transform coefficient included in the transform subblock is performed based on second information specifying whether an absolute value of the transform coefficient is greater than a predetermined value.

8. The image decoding method of claim 7, wherein, based on the transform mode of the current block being the transform skip mode, a context model for parsing the second information is determined depending on whether the intra prediction technique of the current block is the ISP.

9. The image decoding method of claim 7, wherein the predetermined value is 1 or 3.

10. An image decoding apparatus comprising:
a memory; and
at least one processor,
wherein the at least one processor is configured to:
determine whether a prediction mode of a current block is an intra prediction mode, based on information on the prediction mode of the current block;
determine whether a transform mode of the current block is a transform skip mode;
determine whether an intra prediction technique of the current block is intra sub-partitions (ISP), based on the prediction mode of the current block being the intra prediction mode; and
generate a transform coefficient block of the current block, based on the transform mode of the current block and whether the intra prediction technique of the current block is the ISP,
wherein the generating the transform coefficient block comprises the at least one processor configured to:
split the transform coefficient block of the current block into transform subblocks having a predetermined size; and
reconstruct a transform coefficient included in a transform subblock by decoding information on the transform coefficient included in the transform subblock,
wherein the reconstructing the transform coefficient included in the transform subblock is performed based on first information specifying whether a non-zero transform coefficient is included in the transform subblock, and
wherein, based on the transform mode of the current block being the transform skip mode and the intra prediction technique of the current block being the ISP, parsing of the first information is skipped, and the first information is set to specify that the transform subblock includes the non-zero transform coefficient.

11. An image encoding method performed by an image encoding apparatus, the image encoding method comprising:
determining whether a prediction mode of a current block is an intra prediction mode;
determining whether a transform mode of the current block is a transform skip mode;
determining whether an intra prediction technique of the current block is intra sub-partitions (ISP), based on the prediction mode of the current block being the intra prediction mode; and
encoding information on a transform coefficient of the current block, based on the transform mode of the current block and whether the intra prediction technique of the current block is the ISP,
wherein the encoding the information on the transform coefficient comprises:
splitting a transform coefficient block of the current block into transform subblocks having a predetermined size; and
encoding a transform coefficient included in a transform subblock,
wherein the encoding the transform coefficient included in the transform subblock is performed based on first information specifying whether a non-zero transform coefficient is included in the transform subblock, and wherein, based on the transform mode of the current block being the transform skip mode and the intra prediction technique of the current block being the ISP, encoding of the first information is skipped, and the first information is set to specify that the transform subblock includes the non-zero transform coefficient.

12. A method of transmitting a bitstream generated by the image encoding method of claim 11.

* * * * *